COATING OR PLASTIC.

95

Patented Aug. 27, 1929.                                                    1,726,472

UNITED STATES PATENT OFFICE.

CHARLES CATLETT, OF STAUNTON, VIRGINIA.

MANUFACTURE AND USE OF OXYSALT COMPOSITION.

No Drawing.      Application filed July 26, 1923.   Serial No. 654,036.

This invention relates to manufacture and use of oxysalt compositions; and in particular it relates to the preparation and use of novel compositions of matter containing oxysalt compositions as characteristic constituents in substantial or relatively large proportions, especially such compounds as oxychlorids of calcium, magnesium and earth metals generally, said compounds being in the nature of set cement compounds in the sense that they have attained a condition of crystallization to a greater or less degree; and said compositions also including an oleaginous ingredient intimately associated with and disseminated through the same.

In my prior United States Patents Nos. 1,282,188, granted October 22, 1918, 1,308,931 and 1,308,932, granted July 8, 1919, and 1,422,337, granted July 11, 1922, are disclosed the manufacture and use of oxysalt compositions of the general character with which the present invention is concerned, the novel compositions of the present invention being characterized by the inclusion of oleaginous matter in relatively small proportion as will hereinafter more fully appear; this addition of oleaginous matter constituting the most important feature differentiating the novel compositions hereinafter to be disclosed from those described in my prior patents aforesaid.

The pulverized oxysalt compositions described and claimed in my prior patents aforesaid, and particularly the calcium oxychlorid compositions, have gone into extensive use, especially for the regulation of the set and early time strength of Portland cement and other mixtures, in which use said compositions have been found to offer great practical advantages that are well recognized in the art. I have now found that if, in manufacturing said oxysalt compositions in accordance with any of the methods set forth in my prior patents aforesaid, there be added an oleaginous material in properly restricted amount, the completeness of the reaction resulting in the desired oxysalt formation is not adversely affected, while at the same time the resultant reaction product is in more desirable form in that is occurs in smaller and more friable masses which are more easily and more perfectly pulverized in the grinding apparatus, thus making it a simpler matter to obtain a final product than can be effectively and uniformly mixed with and distributed through cement and concrete materials. If such oleaginous material is added in amount insufficient to inhibit the oxysalt-forming reaction, such as the reaction between lime and calcium chlorid, the amount of oleaginous matter in the final product is not so large as in any way to interfere with or adversely affect use of the oxysalt composition (e. g. oxychlorid) as a regulator of the set and strength of Portland cement and concrete mixtures. Moreover, while the relatively small proportion of oleaginous matter ordinarily characterizing compostions of the present invention is not sufficient to produce a waterproof cement or concrete, when such oxysalt compositions are added in the proportions in which they are commonly used in cement and concrete mixtures, nevertheless it has an appreciable and valuable effect in reducing capillarity and lessening the tendency of the cement or concrete to absorb water from the atmosphere or otherwise.

At present the invention is of greatest practical utility in connection with the manufacture and use of calcium oxychlorid compositions, and in the further detailed disclosure of the principles of the invention, reference will therefore be made more particularly to such compositions without intending thereby to restrict the invention to this specific field. It is to be understood, moreover, that in the practical manufacture of the novel compositions, ordinary commercial lime or lime-hydrate may be used, and that such lime products are often high in magnesia, so that the oxchlorid compositions produced often contain substantial proportions of magnesium oxychlorid as well as calcium oxychlorid. This is not objectionable and is indeed so advantageous for some purposes that it is often good practice to use a magnesian lime or lime hydrate in making up the mix with calcium chlorid. Moreover, as my prior patents point out, calcium oxychlorid is not to be understood as a compound of fixed or invariable formula. On the contrary it may vary considerably in constitution, especially as regards water of combination or crystallization, depending upon the conditions under which it is formed, the character and proportions of the reacting materials from which it is derived, and other factors. Therefore, as herein used, the term is to be understood as designating broadly any of the products commonly resulting from the reaction between commercial forms of lime and calcium chlorid in the presence of available $H_2O$, whether this latter be in the form of water added to the mix, or available as water of crystallization or as water vapor that can be abstracted from the atmosphere by the reacting materials.

The general character of oxysalt compositions of the type herein referred to, and especially calcium oxychlorid compositions, in particular, is fully set forth in my aforesaid prior patents, together with practical methods of manufacturing same, as well as utilizing the same in cement, concrete, and lime mixtures. It will not be necessary therefore in the present disclosure to repeat these details in full, but reference is hereby made to said prior patents for all such details, the disclosure of said patents being hereby made a part of the present disclosure for purposes of convenience.

In the practice of the present invention, any of the methods of manufacturing the oxysalt compositions described in said prior patents, or any other suitable procedure adapted for the purpose, may be made use of, subject to the modification that oleaginous matter is incorporated with the materials in proper proportions in the course of manufacture. In the broader aspects of the invention, the precise character of the oleaginous matter is not material. Practically any animal, vegetable or mineral oil or grease can be employed. In practice, oleaginous matter which is more or less completely saponifiable is found to have certain advantages and is therefore to be especially recommended. On the other hand, a mineral oil, either crude or refined, paraffin either as such or dissolved in oil, and the like, are examples of unsaponifiable oleaginous matter that can be employed within the scope of the invention.

According to one specific way of manufacturing calcium oxychlorid composition in accordance with the invention, calcium chlorid may be ground with hydrated lime, from 1 to 2 percent of cottonseed oil or other vegetable oil being added to the materials in the mill. The grinding is so conducted that the lime and calcium chlorid are reduced to such extremely fine condition and the particles thus brought into such intimate contact that the formation of calcium oxychlorid occurs with comparative rapidity, conversion of a large proportion of the calcium chlorid into oxychlorid being readily apparent immediately after grinding, and the reaction being apparently complete within a relatively short time after the ground mixture is discharged from the mill. In this particular instance, the necessary $H_2O$ is provided largely by the hydrated lime, although a part may be drawn from the atmosphere by the calcium chlorid. The pulverulent composition thus obtained is substantially stable and remains dry and pulverulent when handled in commercial packages in the same way that lime, cement, and similar products are ordinarily handled. Upon addition of water, it undergoes decomposition in the manner fully set forth in my prior patents aforesaid, yielding calcium chlorid and calcium hydroxid, or at any rate conducting itself in a manner indicating such action. The dry pulverulent composition may therefore be conveniently referred to as containing "available calcium chlorid". The percentage of such available calcium chlorid in the composition varies with the character and proportions of the ingredients of the mix. In general the available calcium chlorid content should be at least 2 per cent, and ordinarily upwards of 15 per cent is the best practice. Compositions running between 20 and 35 per cent available calcium chlorid can be consistently produced commercially with advantage, and compositions containing even the upper percentage mentioned are characterized by excellent stability. It is not to be inferred that the upper limit for available calcium chlorid content is 35 per cent, the range of 20 to 35 per cent being merely indicative of average commercial practice under the present invention. A calcium oxychlorid composition containing about 20 to 22 per cent of available calcium chlorid is obtainable in accordance with the procedure above described when the mix placed in the grinding mill contains hydrated lime and flaked or granular calcium chlorid in the proportion of 100 pounds of lime to 42 pounds of calcium chlorid.

Referring to another practical embodiment of the process of the invention, the calcium hydrate is employed in the form of a slurry to which is added calcium chlorid in lumps, together with about 1 per cent of beef tallow. The wet mix is passed through a rotary drier heated in any suitable manner, the temperature being amply high to melt the beef tallow and enable its thorough dissemination throughout the reaction mass. The reaction takes place rapidly, and the calcium oxychlorid composition passes from the rotary drier in the form of small nodules which are then ground in a suitable mill to produce the final pulverulent product in commercial form.

The novel oxysalt compositions of the invention, and particularly the calcium oxychlorid compositions, can be used, as stated, in mixture with cement, lime, and the like, in the same manner as its set forth in my prior patents aforesaid in connection with the earlier oxysalt compositions. The proportions in which the novel compositions are added to the cement, lime, and the like, naturally vary in accordance with the requirements of a particular situation; but in employing them with Portland cement, it is seldom necessary to use more than 10 per cent on the weight of the cement, assuming that the composition has an available calcium chlorid content of the usual range, say 20 to 30 per cent. In mixing with lime hydrate, for example, an amount of oxychlorid composition equivalent to about 1 per cent of available calcium chlorid on the weight of the hydrate is common practice. Dry pulverulent mixtures constituted as described can be prepared and shipped as such; or the necessary proportions of calcium oxychlorid composition can be mixed with the cement or lime at the place of use. In all cases the relatively small content of oleaginous matter, uniformly distributed throughout the mass by proper mixing, is found to give an appreciable and highly desirable resistance to moisture as above stated, while in addition the calcium oxychlorid exercises its normal regulating effect on the set and early time strength.

By "relatively small amount of oleaginous material," or similar wording, as herein employed, is meant an amount of the order of magnitude of five per cent or less, and ordinarily not more than about two or three per cent, based on the weight of the oxysalt composition or of the materials reacting to produce the oxysalt composition.

What is claimed is:

1. The process of producing useful oxysalt compositions of the character described which comprises mixing an oxid and a salt, together with a relatively small amount of oleaginous material, under reacting conditions, and reducing the resultant reaction mass to finely divided condition.

2. The process of producing useful oxychlorid compositions of the character described, which comprises reacting between lime and calcium chlorid in a mixture comprising also a small amount of oleaginous material, available $H_2O$ being present, and reducing the resultant reaction mass to finely divided condition.

3. The process of producing useful oxychlorid compositions of the character described, which comprises grinding intimately together hydrated lime, calcium chloride and oleaginous material in amount not substantially exceeding 2 per cent of the combined weight of the lime and calcium chlorid.

4. As a new article of manufacture, a pulverulent material comprising principally an oxysalt composition decomposable by water and oleaginous matter intimately commingled therewith.

5. As a new article of manufacture, a substantially dry pulverulent material consisting principally of a calcium oxychlorid composition with which is intimately commingled a small proportion of oleaginous matter.

6. As a new article of manufacture, a substantially dry pulverulent material consisting principally of a calcium oxychlorid composition with which is intimately commingled not substantially more than 2 per cent of oleaginous matter.

7. As a new article of manufacture, a relatively dry pulverulent composition analyzing upward of 2 per cent by weight of calcium chlorid combined as calcium oxychlorid, and carrying oleaginous mater distributed therethrough.

8. As a new article of manufacture, a relatively dry pulverulent composition containing between about 20 and 35 per cent of available calcium chlorid and carrying a small percentage of oleaginous matter distributed therethrough.

9. As a new article of manufacture, a relatively dry pulverulent composition containing between about 20 and 35 per cent of available calcium chlorid and carrying not to exceed about 2 per cent of oleaginous matter distributed therethrough.

10. As a new article of manufacture, a relatively dry pulverulent composition comprising lime hydrate, an oxychlorid of calcium, and oleaginous matter distributed through the mixture.

11. As a novel cementitious composition, a substantially dry pulverulent mixture comprising a hydraulic cement, an oxysalt material decomposable by water, and oleaginous matter, all commingled.

In testimony whereof I hereunto affix my signature.

CHARLES CATLETT.